Oct. 17, 1933.   H. C. BAKER   1,930,737
METAL WHEEL
Filed May 31, 1929   3 Sheets-Sheet 1

INVENTOR
Harry C. Baker
BY Howard D. Smith
His ATTORNEY

Oct. 17, 1933.   H. C. BAKER   1,930,737
METAL WHEEL
Filed May 31, 1929   3 Sheets-Sheet 2

INVENTOR,
Harry C. Baker,
BY Howard P. Smith,
ATTORNEY

Oct. 17, 1933.　　　　H. C. BAKER　　　　1,930,737
METAL WHEEL
Filed May 31, 1929　　　3 Sheets-Sheet 3

INVENTOR,
Harry C. Baker,
BY Howard D. Smith,
His ATTORNEY

Patented Oct. 17, 1933

1,930,737

UNITED STATES PATENT OFFICE 1,930,737

METAL WHEEL

Harry C. Baker, West Alexandria, Ohio, assignor to The Dayton Steel Foundry Company, Dayton, Ohio, a corporation of Ohio Application May 31, 1929. Serial No. 367,270

2 Claims. (Cl. 301—13)

This invention relates to new and useful improvements in metal wheels.

It is one of the principal objects of my invention to provide a dual metal vehicle wheel of the continuous or spider type having a removable outboard felloe portion. This outboard felloe, which is preferably in two sections, fits over two driving pins in a U channel in the wheel. Both halves of the outboard felloe may then be easily removed to permit the mounting of the inboard rim upon the inboard felloe, which is fixedly secured to the wheel.

My invention also insures a positive alinement of the tire rims in a plane at right angles to the axis of a dual wheel of the spider or continuous type. It is also applicable to a single wheel of either type.

When applied to either a single or a dual wheel of the spider or continuous type, the channel portion thereof may be easily machined to take different kinds of felloes.

Other important and incidental objects will be brought out in the following specification and particularly set forth in the subjoined claims.

Figure 1:
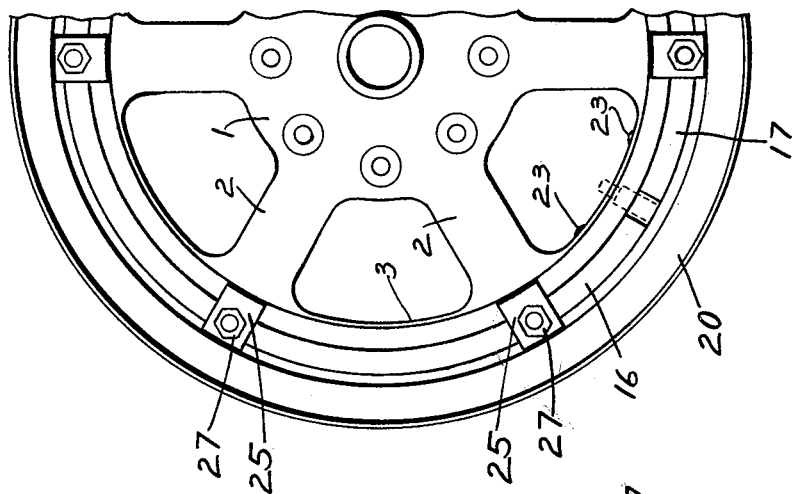
Figure 2:
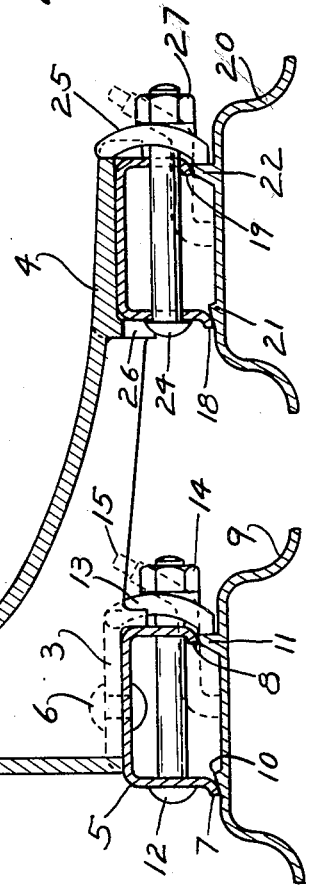
Figure 3:
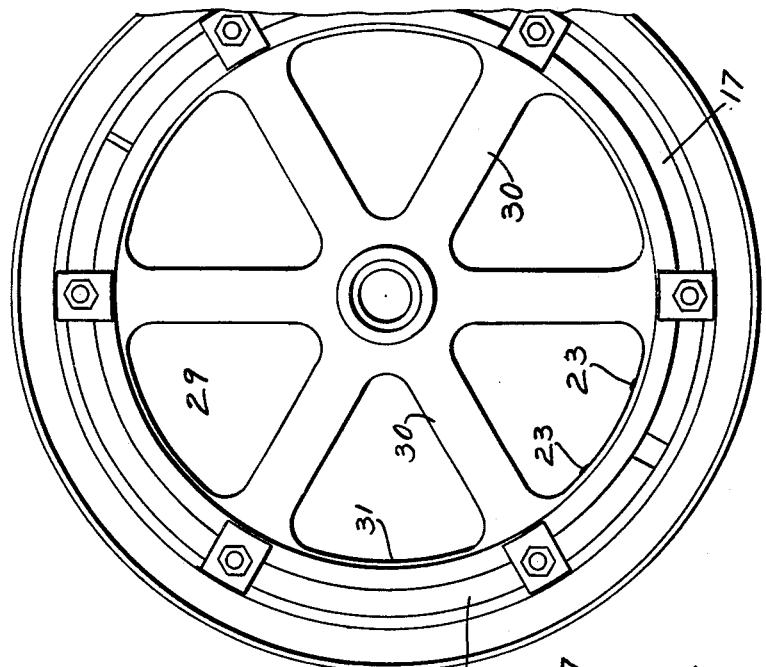
Figure 5:
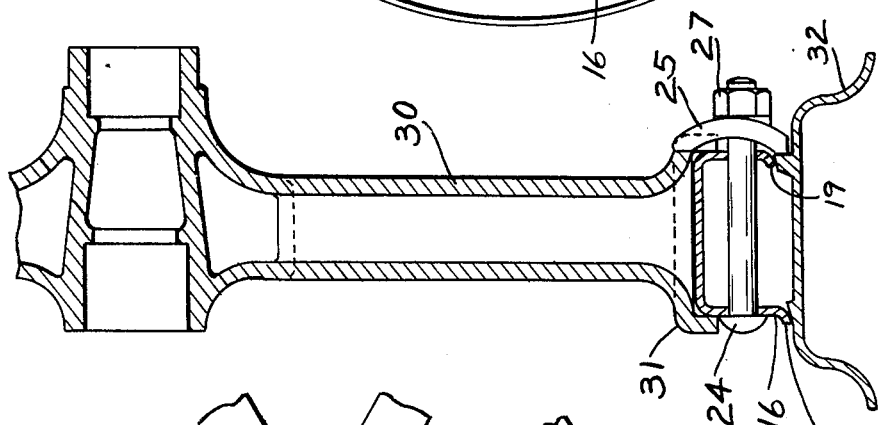
Figure 4:
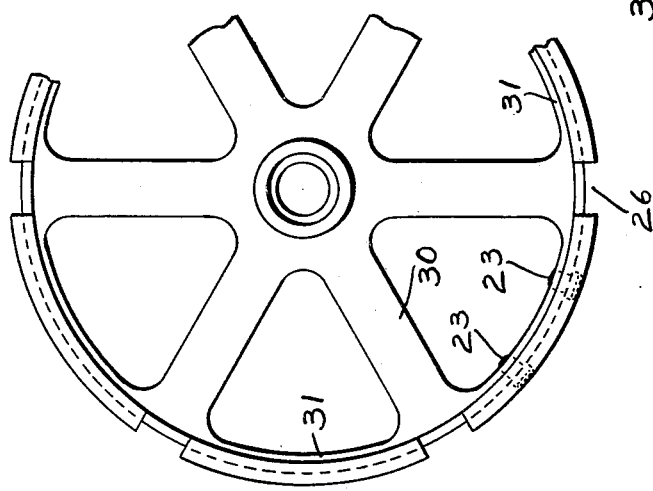
Figure 6:
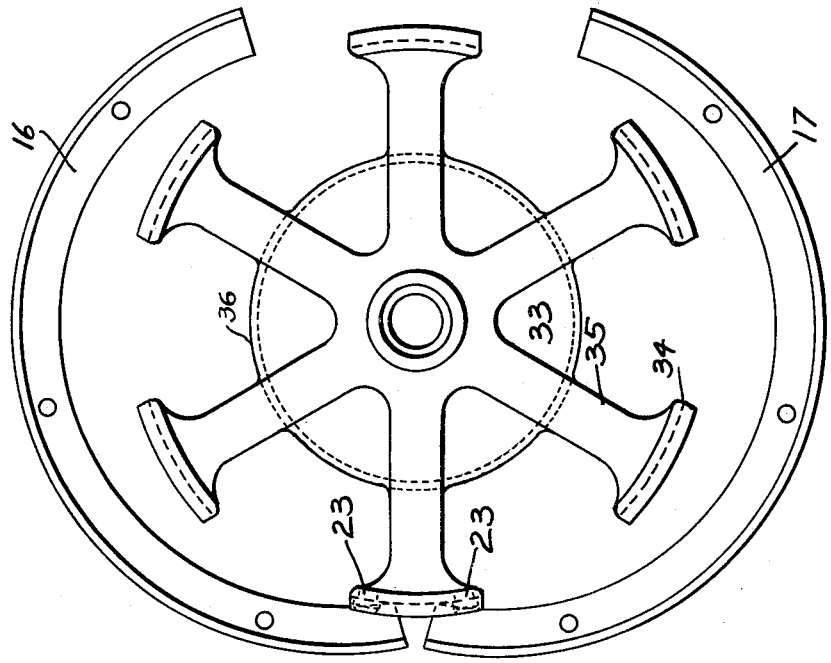
Figure 7:
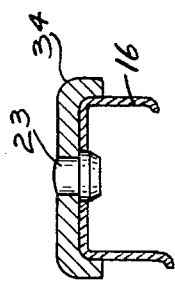
Figure 8:
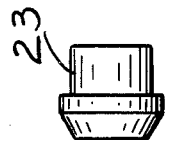

In the accompanying drawings illustrating different forms of embodiment of my invention, Figure 1 is a front elevational view of a continuous dual wheel embodying my invention. Figure 2 is a radial sectional view taken through a spoke portion of the same. Figure 3 is a front view of a single continuous wheel provided with my removable sectional felloe. Figure 4 is a front view of the same, with the demountable felloe removed. Figure 5 is a radial sectional view taken through a spoke portion of the same. Figure 6 is a front view of a spider type of wheel, showing how the sections of the felloe are mounted in the channel portion of the spoke ends. Figure 7 is a cross sectional view taken through one of the channel spoke ends and the removable felloe, showing how the latter is fitted over one of the driving pins in the spoke end. And Figure 8 is a side view of one of the driving pins.

Referring to the accompanying drawings for a detailed description of the different forms of embodiment of my invention therein shown, the numeral 1 in Figure 1 designates the hub, and 2 the spokes, of a dual wheel. Each spoke 2 is integral at its radially outer flaring end with an inboard continuous felloe support 3 and an outboard channel felloe support 4.

The inboard felloe support 3 of the wheel has an inwardly flanged flat supporting surface to which a U shaped felloe 5 is fixedly secured by rivets 6. The outboard side of this U shaped felloe is formed with a beveled seat 7. The inboard side, which is shorter, is formed with a beveled seat 8 which is tapered in the same outward direction as the seat 7. (See Figure 2.)

An inboard tire rim 9 is secured upon the fixed felloe 5 in the following manner. This rim has a slightly raised annular beveled projection 10 which rests upon the inboard seat 7 of the felloe 5, while a longer beveled annular projection 11 is formed on the inboard part of the rim for engagement with the felloe seat 8.

Between the spokes 2 the sides of the felloe 6 are formed with oppositely disposed holes to receive clamping bolts 12. Mounted on the axially inner ends of these bolts are curved clamps 13 which at their radially inner ends engage the flanged portion of the felloe support 3 and at their radially outer ends the projection 11 on the rim 9. Nuts 14 applied to the threaded ends of these bolts, engage the clamps 13 to cause them to solidly maintain the inboard tire rim 9 on its beveled seats 7 and 8 in positive alinement with a plane at right angles to the axis of the wheel.

A hole is also provided in the inboard side of the felloe 5 between two spokes to accommodate the valve stem 15 of the tire on the inboard rim.

In order to permit the mounting and demounting of the inboard rim past the outboard felloe support 4, the outboard felloe, which will now be described, is removable. Referring to Figure 6, the outboard felloe consists of complemental semi-circular sections 16 and 17. Like the felloe 5, each section of the outboard felloe is U shaped, with an axially inwardly turned beveled seat 18 on its longer side and an axially inwardly turned beveled seat 19 on its shorter side. An outboard tire rim 20, similar to the inboard tire rim 9, has beveled projections 21 and 22 for engagement with said seats. (See Figure 2.)

After the inboard tire rim 9 is clamped in its true position upon the fixed felloe 5, the outboard felloe sections 16 and 17 are applied to the channel support 4 as follows. Fitted in two spaced radial holes formed in said support between two spoke portions 2, 2 are two driving pins 23, 23. Referring to Figures 7 and 8, each one of these pins is substantially mushroom shaped to easily fit a radial hole in each outboard felloe section near one end thereof. Therefore, the mounting of a felloe section is effected, first by hooking the apertured end of it over the beveled portion of its respective driving pin 23 projecting radially outwardly from the channel felloe support 4 and then swinging its free end axially inwardly until it lies entirely within said support. The other outboard felloe section is then hooked over its respective driving pin 23 and swung axially inwardly to its home position within the channel support 4.

When the outboard felloe sections 16 and 17 are completely mounted on the supporting portion 4 of the wheel, the outboard tire rim 20 is mounted on its beveled seats 18 and 19. The inboard sides of the U shaped felloe sections are formed with holes to receive clamping bolts 24 which project through slots in the outboard sides of said sections. These bolts carry on their axially outer ends curved clamps 25 whose radially inner ends fit within slots 26 formed in the felloe support 4 at the spokes. With their radially inner ends so anchored, the radially outer ends of the clamps 25 are forced against the annular beveled projection 19 on the outboard rim 20, by nuts 27 applied to the threaded ends of the bolts, to maintain it solidly on its beveled seats in positive alinement with a plane at right angles to the axis of the wheel.

The outboard felloe sections 16 and 17 do not come into abutting engagement at their driving pin ends, leaving sufficient space for the protrusion of the valve stem of the outboard tire.

By removing the nuts 27 and clamps 25, the outboard tire rim 20 may be easily taken off, after which the outboard felloe sections 16 and 17 may be demounted to permit the easy removal of the inboard rim 9.

In Figure 3 I have shown a single continuous wheel 29. Each spoke portion 30 of this wheel terminates in a continuous U shaped rim 31. (See Figures 4 and 5.) Adapted to be mounted on this channel rim are two felloe sections similar to the felloe sections 16 and 17 and which will be designated by the same numbers. A tire rim 32 similar to the rim 20 is firmly held on the beveled seats on the felloe sections by the clamps 25 and nuts 27 on the bolts 24. These clamps at their radially inner ends fit into the slots 26 in the channel rim 31, while their radially outer ends engage the annular projection 19 on the tire rim. The engagement of these clamps with the tire rim not only forces it axially inwardly against the beveled seats on the felloe sections, but also presses these sections radially to solidly engage their channel support. This is true for both the dual and the single wheel described.

This type of single wheel enables the channel rim section to be easily machined to take different kinds of felloes, upon which the tire rim is readily mounted and from which it may be easily removed.

In Figure 6 I have shown a spider type of wheel 33, the ends 34 of whose spoke portions 35 are channeled as shown in Figure 7 to receive the felloe sections 16 and 17. The two driving pins 23, 23 in the spider type of wheel are secured to one of the channeled ends of a spoke portion as shown in Figure 6, to receive the apertured ends of the felloe sections, whose free ends are then swung toward each other to rest completely within the channeled ends of the other spokes. When so mounted in the channeled spoke ends, the felloe sections 16 and 17 are ready to support a tire rim in the manner hereinbefore described.

Integral with the spoke portions 35 of the spider 33 is a brake drum 36.

Having described my invention, I claim:

1. A metal wheel having a hub and extended hub portion, the latter formed with a channel peripheral surface, two demountable felloe sections on the latter, a tire rim on said felloe sections, and driving means on said channel surface for engagement with the felloe sections and to maintain them a sufficient distance apart at their driving ends to form a space to receive a valve stem.

2. An outboard rim mounting for a metal wheel, comprising a hub and a channel shaped felloe support, and complemental U-shaped felloe sections mounted on the outer support and terminating at their outer edges in beveled rim seats.

HARRY C. BAKER.